(12) United States Patent
Tatemoto et al.

(10) Patent No.: US 6,299,789 B1
(45) Date of Patent: Oct. 9, 2001

(54) SYNTHETIC-FIBER TREATMENT COMPOSITION WITH SATISFACTORY BIODEGRADABILITY

(75) Inventors: Shinichi Tatemoto; Tetsuo Doi; Yasuhiko Yada, all of Osaka (JP)

(73) Assignee: Matsumoto Yushi-Seiyaku Co., Ltd., Yao (JP)

( * ) Notice: Subject to any disclaimer, the term of this patent is extended or adjusted under 35 U.S.C. 154(b) by 0 days.

(21) Appl. No.: 09/744,981

(22) PCT Filed: Aug. 12, 1999

(86) PCT No.: PCT/JP99/04367

§ 371 Date: Feb. 16, 2001

§ 102(e) Date: Feb. 16, 2001

(87) PCT Pub. No.: WO00/11258

PCT Pub. Date: Mar. 2, 2000

(30) Foreign Application Priority Data

Aug. 18, 1998 (JP) .................................................. 10-249105

(51) Int. Cl.$^7$ .............................. D06M 9/00; C08G 63/66
(52) U.S. Cl. .................... 252/8.84; 528/274; 528/279; 528/300; 528/301; 252/8.61; 252/8.81
(58) Field of Search ..................................... 528/274, 279, 528/300, 301; 252/8.61, 8.81, 8.84

(56) References Cited

U.S. PATENT DOCUMENTS

| | | | |
|---|---|---|---|
| 4,169,062 | 9/1979 | Weipert | 252/8.9 |
| 4,957,648 * | 9/1990 | Yodice et al. | 252/8.6 |
| 5,434,237 | 7/1995 | Weinelt et al. | 528/272 |
| 5,760,265 | 6/1998 | Takahara et al. | 556/51 |

FOREIGN PATENT DOCUMENTS

| | | |
|---|---|---|
| 5-44167 | 2/1993 | (JP) . |
| 6-505062 | 6/1994 | (JP) . |
| 6-316547 | 11/1994 | (JP) . |

* cited by examiner

Primary Examiner—Samuel A. Acquah
(74) Attorney, Agent, or Firm—Foley & Lardner

(57) ABSTRACT

The invention provides a finish composition for synthetic filament, which does not generate fume and tar at high speed and high temperature, imparts superior lubricity at high temperature, superior antistaticity and yarn winding performance, and has satisfactory biodegradability. The finish composition for synthetic fiber of the invention is characterized by containing one or more of polyether polyester compounds having a molecular weight of 1,000 to 20,000 and represented by the formula: X—(A—B)$_n$—A'—Y. In the formula, each of X and Y is independently hydrogen, or a residue of $C_{1-8}$ linear or branched saturated alcohol or $C_{1-18}$ fatty acid; each of A and A' is a residue of ethylene oxide/propylene oxide block or random copolymer containing ethylene oxide and propylene oxide from 9:1 to 1:9 mol ratio; B is an aliphatic dibasic acid residue represented as OOC(CH$_2$)$_m$COO; m is an integer from 1 to 4; and n is an integer from 1 to 3.

3 Claims, No Drawings

SYNTHETIC-FIBER TREATMENT COMPOSITION WITH SATISFACTORY BIODEGRADABILITY

TECHNICAL FIELD

The present invention relates to a finish composition for synthetic fiber characterized by containing specific polyether polyester compounds which are biodegradable, minimize broken filament and ends down in production and processing of synthetic filament applied with the compounds and enable the production of high-quality textile products.

TECHNICAL BACKGROUND

Synthetic filament, such as polyester and nylon, is applied with a finish just after being extruded from spinnerets for the purpose of eliminating broken filament and ends down in yarn production and processing, passing the filament through the processes easily and being processed into high quality textile products.

Especially, the finishes applied in the spinning process of polyester or nylon filament to be processed into textured yarn or industrial textiles are required to be thermally durable because such filament is exposed to heat on heater rolls or plates in yarn production, texturing or further processing stages. The thermal durability mentioned here is a special property of finishes that do not easily decompose to change into fume during a short time heating and decomposes easily during a long time heating not to remain as tar buildup on heater rolls or plates. In addition, the finishes for polyester or nylon filament to be processed into textured yarn or industrial textiles are also required to impart superior lubricity, antistaticity and yarn winding performance to filament at high temperature for the purpose of minimizing ends down, broken filament and deposit in yarn production and processing, passing filament easily through yarn production and processing stages and producing excellent textile products.

Recent increase of yarn production and processing speed and demand for high-quality textile products resulted in the increase of the temperature of heater rolls or plates and consequently the demand for finishes that do not generate fume or tar buildup mentioned above has been increasing. In addition, the increase of the processing speed has accelerated the demand to finishes to impart lubricity, antistaticity and yarn winding performance at high temperature.

Furthermore those finishes are expected to be biodegradable because they are washed with water before yarn is processed into end products and the washed off finishes are treated in the wastewater.

In the conventional processes, the polyester or nylon filament to be fed to texturing process has been applied with finishes of which major component is ethylene oxide/propylene oxide block or random copolymers having 1,000 to 20,000 molecular weight and containing ethylene oxide and propylene oxide from 9:1 to 1:9 mol ratio.

The above copolymers do not easily decompose to change into fume during a short time heating but easily decompose during a long time heating not to remain as tar buildup on heater rolls or plates. They are commonly used even at present owing to their superior lubricity and antistaticity at high temperature.

However, the above copolymers has poor biodegradability and cannot meet the demand for the recent high-speed process and high quality textile products because of their unacceptable yarn winding performance and insufficient lubricity and antistaticity at high temperature.

Thus a finish for synthetic filament that causes neither fume nor tar buildup in high speed and high temperature process, imparts superior lubricity, antistaticity and yarn winding performance to filament and is biodegradable is required.

For solving the above problem, WO 95/21956 suggests polyether polycarbonate produced by reacting polyether and dialkyl carbonate as a biodegradable lubricant. However, the reaction proceeds inefficiently and the target compound cannot be produced in high yield.

In addition, U.S. Pat. No. 4,169,062 suggests a glycol monoester of ethylene oxide/propylene oxide random copolymer and fatty acid as a water-soluble and biodegradable lubricant for synthetic fiber. However, the lubricant causes tar buildup and stain on heaters at high temperature.

DISCLOSURE OF INVENTION

The present invention provides a finish composition for synthetic filament containing one or more of polyether polyester compounds represented by a general formula, X—(A—B)$_n$—A'—Y and having 1,000 to 20,000 molecular weight. And the object of the present invention is to provide a novel biodegradable finish for synthetic fiber that has superior function for preventing the generation of fume and tar buildup and imparting lubricity, antistaticity at high temperature and yarn winding performance to fiber.

In the general formula, each of X and Y is independently hydrogen or the residue of linear or branched saturated alcohol or fatty acid having 1 to 18 carbon atoms; A and A' are the residue of ethylene oxide/propylene oxide block or random copolymer containing ethylene oxide and propylene oxide from 9:1 to 1:9 mol ratio; B is the residue of aliphatic dibasic acid represented as $OOC(CH_2)_mCOO$; m is an integer from 1 to 4; and n is an integer from 1 to 3.

BEST MODE FOR CARRYING OUT THE INVENTION

The present invention is explained in detail as follows.

The molecular weight of the polyether polyester compound of the present invention is from 1,000 to 20,000. A compound having a molecular weight below 1,000 is not proper because it decomposes during a short-time heating and generates fume in yarn production and processing. And a compound having a molecular weight above 20,000 is not proper because it imparts poor lubricity on fiber and increases ends down, broken filament and deposit in yarn production and processing.

Each of the X and Y in the above formula is independently hydrogen or the residue of linear or branched saturated alcohol or fatty acid having 1 to 18 carbon atoms. A saturated alcohol or fatty acid having more than 18 carbon atoms is not suitable for the purpose because it cannot be easily applied due to its poor hydrophilicity and causes a lot of tar buildup. Unsaturated alkyl groups are not suitable too for the purpose of the present invention because they also cause a lot of tar buildup.

The A and A' in the above formula are the residue of ethylene oxide/propylene oxide block or random copolymer containing ethylene oxide and propylene oxide from 9:1 to 1:9 mol ratio. The mol ratio of ethylene oxide to propylene oxide greater than 9:1 causes a lot of tar buildup and that smaller than 1:9 results in copolymers of decreased hydrophilicity. A copolymer containing ethylene oxide in 6:4 or greater mol ratio to propylene oxide is particularly suitable for the purpose of the present invention for its superior biodegradability.

The B in the above formula is the residue of aliphatic dibasic acid represented by $OOC(CH_2)_mCOO$ and m is an integer from 1 to 4. An m greater than 4 is not suitable because of increased tar buildup.

The n in the above formula is an integer from 1 to 3. An n greater than 3 is not suitable for the purpose of the present invention because of decreased lubricity.

The polyether polyester compound of the present invention can be easily produced in high yield by mixing random or block copolymer of ethylene oxide/propylene oxide with low molecular weight aliphatic dibasic acid, its anhydride or dimethyl ester in a proper mol ratio and reacting the mixture at 120 to 240° C. for 3 to 7 hours similarly to general esterification or transesterification processes.

The above esterification or transesterification is carried out in nitrogen atmosphere with known catalysts. Preferable catalysts are those having strong acidity such as paratoluene sulfonic acid or those having weak acidity such as titanium tetra-n-butoxide or titanium tetra-i-propoxide Alkaline compounds such as sodium hydroxide, potassium hydroxide or sodium methylate are not preferable because they decompose ethylene oxide/propylene oxide block or random copolymer and form polyether polyester compounds causing a lot of tar buildup. Titanium tetra-n-butoxide and titanium tetra-i-propoxide are preferable because they easily hydrolyze when water is added and precipitate into inorganic titanium compounds that can be easily removed by filtration.

The ethylene oxide/propylene oxide block or random copolymer used in the present invention is a mono-ol type polyether copolymer produced by adding ethylene oxide and propylene oxide to $C_{1-8}$ linear or branched saturated aliphatic alcohol in block or random state, diol type polyether copolymer produced by adding ethylene oxide and propylene oxide to ethylene glycol or polyethylene glycol in block or random state or the mixture thereof.

The examples of the above $C_{1-18}$ linear or branched saturated aliphatic alcohol are hexanol, octanol, nonanol, decanol, undecanol, dodecanol, tridecanol, tetradecanol, pentadecanol, hexadecanol, heptadecanol, octadecanol and linear alcohols derived from natural oils and fats, such as caproic alcohol, enanthic alcohol, capryl alcohol, pelargonic alcohol, capric alcohol, lauryl alcohol, myristyl alcohol, cetyl alcohol and stearyl alcohol.

The examples of the preferable low molecular weight aliphatic dibasic acids and their anhydrides and dimethyl esters are oxalic acid, malonic acid, adipic acid and their anhydrides and dimethyl esters.

The catalyst remained in the above-mentioned reaction product produced in the esterification or transesterification must be removed in a known process (such as filtration or adsorption with active carbon) to be decreased to 0.01% or less (the percent here means weight percent and hereinafter referred to as the same) of the reaction product. A catalyst contained more than 0.01% causes a lot of tar buildup and deposits on the yarn pass of guides or rolls in yarn production and processing that leads to troubles such as ends down.

The polyether polyester compound of the present invention is preferably being contained in 50% or more of a finish composition for synthetic filament. And other additives can be added to the finish composition if necessary so far as the purpose of the present invention is not inhibited. The examples of such additives are emulsifiers, antistatic agents, antiseptics and antifoaming agents.

The finish composition for synthetic filament of the present invention is usually used being diluted into 8 to 20 weight percent aqueous emulsion. Or it can also be used in a dilution with a solvent such as liquid paraffin, or can be used neat after being heated to decease its viscosity.

The finish composition of the present invention is applied to synthetic filament just after it is extruded from spinneret with an application roll, plate or nozzle in a known method. The amount of the finish on fiber varies according to the end use of synthetic filament and is settled within a range where the finish composition of the present invention functions effectively enough, usually from 0.3 to 1.2 weight percent.

EXAMPLES

The effect of the present invention is further clarified with the examples that explain the present invention. However, the present invention is not restricted within the scope of the following examples.

Example 1. Synthesis of EO/PO Polyether Polyester Compound

The ingredients shown in Table 1 were placed in a 500-ml three-neck distillation flask equipped with a reflux condenser. The reaction was conducted with agitation and heating at 120° C. for 1 hour and then at 150° C. for 1 hour flowing nitrogen gas gradually on the surface of the ingredients similar to usual esterification and then the temperature was increased to 180° C. After raising the temperature to 180° C., the temperature was kept constant (at 180° C.) and the agitation was continued. The conversion of the ingredients represented as the present invention 3, 4, 9 and Comparative example 4 were checked by detecting their acid values and those of the ingredients represented as the present invention 1, 2, 5, 6, 7, 8, Comparative examples 1, 2 and 3 were checked by detecting their molecular weight with high-speed chromatography to determine the end of reaction similarly to usual esterification. And their reaction was stopped in the period shown in Table 2. The reaction products from the ingredients represented as the present invention 3, 4, 9 and Comparative example 4 were filtrated and refined and the reaction products from the ingredients represented as the present invention 1, 2, 5, 6, 7, 8, Comparative examples 1, 2 and 3 were refined in the manner described in U.S. Pat. No. 5,760,265 to obtain the polyether polyesters shown in Table 2.

TABLE 1

| Ingredients | Test No. | Present Invention | | | | | | | | | Comparative example | | | |
| --- | --- | --- | --- | --- | --- | --- | --- | --- | --- | --- | --- | --- | --- | --- |
| | | 1 | 2 | 3 | 4 | 5 | 6 | 7 | 8 | 9 | 1 | 2 | 3 | 4 |
| Polyether compound 1 | | 278.0 | 280.0 | 275.8 | 282.4 | | | 278.0 | 278.0 | | 284.6 | | | |
| Polyether compound 2 | | | | | | 285.0 | | | | 283.4 | | | | |

TABLE 1-continued

|  |  | Present Invention | | | | | | | | | Comparative example | | | |
|---|---|---|---|---|---|---|---|---|---|---|---|---|---|---|
| Ingredients | Test No. | 1 | 2 | 3 | 4 | 5 | 6 | 7 | 8 | 9 | 1 | 2 | 3 | 4 |
| Polyether compound 3 |  |  |  |  |  |  | 275.7 |  |  |  |  |  |  | 202.7 |
| Polyether compound 4 |  |  |  |  |  |  |  |  |  |  |  | 275.7 |  |  |
| Polyether compound 5 |  |  |  |  |  |  |  |  |  |  |  |  | 262.2 |  |
| Adipic acid |  |  |  | 24.2 |  |  |  |  |  | 16.6 |  |  |  |  |
| Malonic acid |  |  |  |  | 17.6 |  |  |  |  |  |  |  |  |  |
| Malonic dimethyl ester |  | 22.0 |  |  |  | 15.0 | 24.3 | 22.0 | 22.0 |  |  | 24.3 | 37.8 |  |
| Oxalic dimethyl ester |  |  | 19.8 |  |  |  |  |  |  |  |  |  |  |  |
| Dimethyl carbonate |  |  |  |  |  |  |  |  |  |  | 15.4 |  |  |  |
| Lauric acid |  |  |  |  |  |  |  |  |  |  |  |  |  | 97.3 |
| Paratoluene sulfonic acid |  |  |  | 1.5 | 1.5 |  |  |  |  | 1.5 |  |  |  | 1.5 |
| Titanium tetra-i-propoxide |  |  |  |  |  |  |  | 0.3 |  |  |  |  |  |  |
| Titanium tetra-n-butoxide |  | 0.3 | 0.3 |  |  | 0.3 | 0.3 |  |  |  | 0.3 | 0.3 | 0.3 |  |
| Sodium methylate |  |  |  |  |  |  |  |  | 0.6 |  |  |  |  |  |
| Sodium hypochlorite |  |  |  | 0.4 | 0.4 |  |  |  |  | 0.4 |  |  |  | 0.4 |

TABLE 2

|  |  | Present Invention | | | | | | |
|---|---|---|---|---|---|---|---|---|
|  | Test No. | 1 | 2 | 3 | 4 | 5 | 6 | 7 |
| Reaction time (hrs) |  | 5.5 | 5.5 | 7.0 | 7.0 | 5.5 | 5.5 | 5.5 |
| Unrefined products |  |  |  |  |  |  |  |  |
| pH (1-% aq. soln.) |  | 5.6 | 5.3 |  |  | 4.8 | 5.3 | 5.1 |
| Metal content (ppm) analyzed with fluorescent X-ray |  | Ti = 93 | Ti = 98 |  |  | Ti = 90 | Ti = 96 | Ti = 105 |
| Refined products |  |  |  |  |  |  |  |  |
| Acid value (KOH mg/g) |  |  |  | 3.5 | 5.3 |  |  |  |
| Hydroxy value (KOH mg/g) |  |  |  | 0.2 | 0.3 |  |  |  |
| Saponification number (KOH mg/g) |  |  |  | 62.0 | 63.0 |  |  |  |
| pH (1-% aq. soln.) |  | 4.1 | 4.6 | 4.5 | 4.3 | 3.7 | 5.1 | 4.4 |
| Average molecular weight in high-speed chromatography |  | 2400 | 2400 | 2600 | 2400 | 4200 | 3300 = 53% 2400 = 24% 1300 = 23% | 2400 |
| Metal content (ppm) analyzed with fluorescent X-ray |  | Ti = 0 | Ti = 0 | SO = 190 P = 134 | SO = 240 P = 190 | Ti = 0 | Ti = 0 | Ti = 0 |

|  |  | Present Invention | | Comparative example | | | |
|---|---|---|---|---|---|---|---|
|  | Test No. | 8 | 9 | 1 | 2 | 3 | 4 |
| Reaction time (hrs) |  | 4.5 | 7.0 | 6.5 | 5.5 | 5.0 | 7.0 |
| Unrefined products |  |  |  |  |  |  |  |
| pH (1-% aq. soln.) |  | 9.0 |  |  |  |  |  |
| Metal content (ppm) analyzed with fluorescent X-ray |  | Na = 470 |  |  |  |  |  |
| Refined products |  |  |  |  |  |  |  |
| Acid value (KOH mg/g) |  |  | 4.4 |  |  |  | 8.3 |
| Hydroxy value (KOH mg/g) |  |  | 0.5 |  |  |  | 0.3 |
| Saponification number (KOH mg/g) |  |  | 42.0 |  |  |  | 90.0 |
| pH (1-% aq. soln.) |  | 8.2 | 4.3 |  | 4.7 | 4.5 | 4.8 |
| Average molecular weight in high-speed chromatography |  | 2400 | 2600 | 1260 | 3200 = 51% 2000 = 25% 1000 = 24% | 1130 | 1600 |
| Metal content (ppm) analyzed with fluorescent X-ray |  | Na = 300 | SO = 200 P = 170 | Ti = 0 | Ti = 0 | Ti = 0 | SO = 180 P = 150 |

(1) The transesterification wherein a titanium compound was used as a catalyst and malonic dimethyl ester and oxalic dimethyl ester were used as the dibasic acid esters could produce EO/PO polyether diester in high yield as shown in the result represented as the present inventions 1 and 2. The reaction wherein dimethyl carbonate was used as the dibasic acid ester failed because the boiling point of dimethyl carbonate was lower than the starting temperature of the reaction and thus the reaction did not proceed well as shown in the result represented as Comparative example 1. The unrefined products were refined in a known process and almost all of the titanium catalysts were removed.

(2) The esterification wherein paratoluene sulfonic acid was used as a catalyst, malonic acid and adipic acid were used as dibasic acids and lauric acid was used as monobasic acid could produce EO/PO polyether diester in a high yield as shown in the result represented as the present inventions 3, 4, 9 and Comparative example 4. A considerable portion of the catalyst, paratoluene sulfonic acid, remained in the products after the unrefined products were refined in a known manner.

The volatile residue of the polyether polyester compounds synthesized with the ingredients represented the present inventions 1 to 9 and Comparative examples 1 to 4 was determined in the above procedure and the data is shown in Table 3 with their metal content detected in fluorescent X-ray analysis.

TABLE 3

| Test No. | Before refinement | | After refinement | |
| --- | --- | --- | --- | --- |
| | Metal content (ppm) | Volatile residue | Metal content (ppm) | Volatile residue |
| Present invention 1 | Ti = 93 | 4.37% | Ti = 0 | 0.29% |
| Present invention 2 | Ti = 98 | 4.03% | Ti = 0 | 0.31% |
| Present invention 3 | | | SO = 190, P = 134 | 2.11% |
| Present invention 4 | | | SO = 240, P = 190 | 1.98% |
| Present invention 5 | Ti = 90 | 4.12% | Ti = 0 | 0.25% |
| Present invention 6 | Ti = 96 | 4.56% | Ti = 0 | 0.35% |
| Present invention 7 | Ti = 105 | 4.67% | Ti = 0 | 0.22% |
| Present invention 8 | Na = 470 | 4.22% | Na = 300 | 3.21% |
| Present invention 9 | | | SO = 200, P = 170 | 2.48% |
| Comparative example 1 | | | Ti = 0 | 0.19% |
| Comparative example 2 | | | Ti = 0 | 4.55% |
| Comparative example 3 | | | Ti = 0 | 4.07% |
| Comparative example 4 | | | SO = 180, P = 150 | 4.62% |

(3) The transesterification wherein the polyether compound 2 or the polyether compound 5 was used as EO/PO polyether instead of the polyether compound 1 or the transesterification wherein titanium tetra-i-propoxide was used as the titanium catalyst instead of titanium tetra-n-butoxide could produce EO/PO polyether diester in a high yield as shown in the result represented as the present inventions 5, 7 and Comparative example 3. The unrefined products were refined in a known process and almost all of the titanium catalysts were removed.

(4) The transesterification wherein diol type EO/PO polyether and a titanium catalyst were used produced the mixture of mono, di and triesters of EO/PO polyether as shown in the result represented as the present invention 6 and Comparative example 2. Almost all of the titanium catalyst was removed in a known refining manner.

(5) The transesterification wherein sodium methylate, an alkaline, was used as a catalyst could produce EO/PO polyether diester in a high yield as shown in the result represented as the present invention 8. However, a considerable portion of sodium methylate, the catalyst, remained in the product after it was refined in a known manner.

Example 2. Determination of Volatile Residue

The finish for synthetic filament of the present invention is required to decompose and evaporate during long time heating not to cause tar buildup from the finish sticking on heater rolls and plates in yarn production and processing.

The decomposition and evaporation behavior of the finishes were evaluated through checking the volatile residue as follows.

Approx. 1 g of a finish was spread on a stainless plate of 60 mm diameter and weighed accurately. The finish was heated in a gear oven at 210° C. for 15 hours and then weighed accurately. The weight ratio of the finish after heating to the finish before heating was calculated into percentage and reported as volatile residue.

(1) As proved with the data of the present inventions 1, 2, 5, 6 and 7, the catalyst remained in the EO/PO polyether polyesters produced in the transesterification of EO/PO polyether and low molecular weight dibasic acid dimethyl ester with a titanium catalyst could be easily removed and the volatile residue from the EO/PO polyether polyesters after removing the catalyst was quite small though the volatile residue before removing the catalyst was great.

(2) As proved with the data of the present invention 3, 4, 8 and 9, paratoluene sulfonic acid or sodium methylate could not easily be removed from the products when they were used as a catalyst and such product left a lot of volatile residue.

(3) The transesterification of the ingredients of Comparative example 1 did not advance well and the EO/PO polyether polyester, the object of the present invention was not produced but EO/PO polyether and dimethyl carbonate remained without being reacted. Thus the quantity of the volatile residue from the substance after reaction was extremely small.

(4) The volatile residue from the products of Comparative examples 2, 3 and4 did not decrease after removing the catalyst, because EO/PO polyether, low molecular weight dibasic acid or its ester was not used for the reaction.

Example 3. Performance on Fiber

The finish for synthetic filament of the present invention is required to attain lubricity between yarn and the yarn pass such as guides or heater plates in yarn production and down-stream processes, improved antistaticity, filament cohesion and resistance to abrasion and to increase friction between yarn and friction-texturing discs when it is applied to the filaments processed into textured yarn.

The polyether polyesters produced in Example 1 were made into aqueous solution and applied to polyester filament yarn (150 de, 36f) in 0.4 weight percent of the yarn with a metering-pump applicator. The yarn was conditioned at 20° C. and 65% relative humidity for 24 hours and its property was tested in the procedure and parameters as shown in Table 4. The data is given in Table 5.

TABLE 4

| Items | Testing procedure and parameters |
|---|---|
| Fume | Test yarns were driven at 20 m/min with 10-g input tension being arranged on a running yarn friction tester produced by Toray Engineering and heated at 210° C. and 250° C. on the heater roll. Fume generated on the heater roll was detected with a fume counter produced by Shibata. |
| Yarn-to-yarn friction at low speed | A test yarn was wound up into a 690-m package with 10 g yarn tension. The fiber-to-fiber friction of the yarn being released from the package at 0.016 m/min with 6 g input tension was tested at 20° C. and 70° C. The testing device was a low speed friction tester produced by Eiko. |
| Yarn-to-metal dynamic friction and static charge | A test yarn was driven on a matte chromium pin (20° C., 40 mm diameter) of a running yarn friction tester produced by Toray Engineering at 200 m/min with 180 degrees wrap angle and 15 g input tension being fed with a roll (20° C. and 210° C.). The output yarn tension was checked and simultaneously the static charge on the output yarn was checked with a static charge meter. |
| Yarn-to= texturing disc dynamic friction | The yarn was driven at 200 m/min on four urethane discs (revolving at 1.6 m/min peripheral speed) with 15 g input tension being fed with a roll at 210° C. and the output tension was detected. |

The comparative yarn sample was a weaving yarn available in market that was not required to be durable against heat. A lot of fume was generated from the yarn but it was not a trouble in an actual yarn production and down-stream processing. On the other hand, the standard finish was a finish being applied to textured yarn without fume trouble in yarn production and down-stream processing and had the following formula.

Formula of the Standard Finish

| | |
|---|---|
| $C_{18}$ EO/PO (50:50) random polyether (M.W. 1600) | 68 weight percent |
| EO/PO (40:60) random polyether (M.W. 3500) | 15 weight percent |
| $C_4$ EO/PO (50:50) random polyether (M.W. 5000) | 15 weight percent |
| Anionic antistatic agent (sodium alkane sulfonate) | 2 weight percent |

The quantity of the fume generated from the polyether esters produced from the ingredients of the present inventions 1, 2, 3, 5, 6 and 9 and of Comparative examples 2, 3 and 4 were similar to that from the standard finish and would not cause fume trouble in yarn production and down-stream processing.

The yarn-to-yarn friction at low speed detected at 20° C. relates to the winding performance of yarn and higher friction is more advantageous for winding. The yarn-to-yarn friction at low speed detected at 70° C. relates to fluff generation on textured yarn and it is well known that lower friction results in less broken filament. The components produced from the ingredients of Comparative examples 2 and 3 and the finish on the comparative yarn exhibited superior winding performance in yarn production and down-stream processing though broken filament were more frequently found on the yarns. On the contrary, the components produced from the ingredients of the present inventions 1, 3, 5, 6 and 9 exhibited low yarn-to-yarn friction at low speed at 70° C. that was preferable for decreasing broken filament on textured yarn while they exhibited similar yarn-to-yarn friction at low speed at 20° C. to that of the standard yarn.

The polyether esters produced from the ingredients of the present invention 1, 3, 5, 6 and 9 wherein an ester group was contained at the center of each of their molecules exhibited low yarn-to-metal dynamic friction at 210° C. that was advantageous for decreasing ends down, broken filament and deposit generated in texturing process. Comparing the yarn-to-metal dynamic friction of the yarn samples applied with the polyether polyesters produced from the ingredients of the present inventions 1, 3, 5, 6 and 9 to that of the yarn samples applied with the polyether polyester produced from the ingredients of Comparative example 4 at 210° C., it was clear that the polyether esters having an ester group at the center of each of their molecules was advantageous to improve lubricity at high temperature.

Example 4. Evaluation of Biodegradability

One of the objects of the present invention is to provide a finish of improved biodegradability. The biodegradability of the finishes was tested according to OECD 301C. The

TABLE 5

| Test No. | Fume (cpm) | | Yarn-to-yarn friction at low speed (g) | | Yarn-to-metal metal dynamic friction (g) | | Static charge at yarn=to-metal contact (v) | Yarn-to= disc dynamic friction (g) |
|---|---|---|---|---|---|---|---|---|
| | 210° C. | 250° C. | 20° C. | 70° C. | 20° C. | 210° C. | | |
| Present invention 1 | 139 | 158 | 19.8 | 22.5 | 45.1 | 29.2 | 0.5 | 42.3 |
| Present invention 3 | 127 | 143 | 19.4 | 21.3 | 45.3 | 28.9 | 0.5 | 42.1 |
| Present invention 5 | 124 | 136 | 19.5 | 22.4 | 44.3 | 29.7 | 1.0 | 42.2 |
| Present invention 6 | 36 | 46 | 19.3 | 20.8 | 43.0 | 28.0 | 0.6 | 56.4 |
| Present invention 9 | 110 | 127 | 19.2 | 21.6 | 45.5 | 28.5 | 0.6 | 41.8 |
| Comparative example 2 | 79 | 107 | 21.8 | 29.3 | 42.9 | 31.7 | 0.5 | 61.4 |
| Comparative example 3 | 152 | 91 | 28.7 | 29.5 | 43.3 | 29.9 | 0.5 | 45.2 |
| Comparative example 4 | 132 | 148 | 19.2 | 28.7 | 41.6 | 39.4 | 1.5 | 42.5 |
| Standard finish | 142 | 63 | 19.0 | 32.2 | 39.0 | 39.8 | 1.3 | 50.9 |
| Comparative yarn | 3,450 | 4,720 | 27.2 | 39.8 | 37.2 | 39.6 | 0.5 | 43.7 | degradation ratio of the finishes in 28 days after activated sludge was added is shown in Table 6. The finishes of the present invention exhibited superior biodegradability, 70% or more.

TABLE 6

|  | Present invention | | | | | Comparative examples | | | Standard |
|---|---|---|---|---|---|---|---|---|---|
| Test No. | 1 | 2 | 5 | 6 | 9 | 2 | 3 | 4 | finish |
| Degradation ratio (%) | 80 or more | 80 or more | 75 | 80 or more | 73 | 80 or more | 80 or more | 80 or more | 20 or less |

The data in Table 6 shows that the standard finish of which major component is the copolymer of ethylene oxide and propylene oxide has poor biodegradability. On the other hand, the polyether polyester compounds of the present invention and Comparative examples have superior biodegradability. Above all, the polyether polyesters of the present inventions 1, 3 and 6 wherein the mol ratio of ethylene oxide to propylene oxide was greater than 6:4 exhibited superior biodegradability.

Example 5

POY (partially oriented yarn) samples were prepared by applying the aqueous solution of each of the finish containing the components of the present invention described below and the standard finish mentioned above. The POY samples were draw-textured and the broken filament, full-package yield (yield of 5 kg packages without ends down) and stain on heater surface were checked.

The finish Containing the Components of the Present Invention

| | |
|---|---|
| Component of the present invention 1 | 53 weight percent |
| Component of the present invention 5 | 20 weight percent |
| PEG dicaprate | 15 weight percent |
| POE alkyl ($C_{12}$ and $C_{14}$) ether | 10 weight percent |
| Anionic antistatic agent (sodium alkane sulfonate) | 2 weight percent |

POY Spinning Parameters

| | |
|---|---|
| Finish concentration in aqueous solution | 10% |
| Solid portion of finish on yarn | 0.4 weight percent of yarn |
| Spinning speed | 3200 m/min |
| Yarn type | polyester, 260d/48f |

Draw-texturing Parameters

| | |
|---|---|
| Draw-texturing speed: | 800 m/min |
| Temperature of 1st heater: | 210° C. |
| Temperature of 2nd heater: | 180° C. |
| Draw ratio: | 1.74 |
| Disc speed/yarn speed: | 2.05 |

Evaluation

The draw-texturing test was conducted for 20 days. And the full-package yield, broken filament and stain on heater surface were evaluated in the following procedure.

Full-package yield: the ratio of full packages (5 kg) wound without ends down during the 20 days draw-texturing test Broken filament: frequency of broken filament per 1 kg of draw-textured yarn calculated from the frequency data of broken filament from one hundred of draw-textured yarn packages checked through visual inspection Stain on heater surface: stain on the 1st heater surface after 20 days draw-texturing operation checked through visual inspection Biodegradability: degradation ratio of the test finishes 28 days after adding activated sludge into the finishes checked according to OECD 301C The data of full-package yield, broken filament, stain on heater surface and biodegradability are shown in Table 7.

TABLE 7

| Test No. | Finish of the present invention | Standard finish |
|---|---|---|
| Full-package yield | 98.6 | 92.8 |
| Broken filament (frequency/kg) | 0.2 | 0.6 |
| Stain on heater | slight | slight |
| Biodegradability (%) | 80 or more | 20 or less |

The data in Table 7 clearly shows that the finishes containing the component of the present invention have superior biodegradability and are more advantageous for decreasing ends down and broken filament in draw-texturing process than the conventional finishes containing EO/PO polyether as a major component.

POSSIBILITY FOR INDUSTRIAL USE

The above volatile residue data clearly shows the EO/PO polyether polyester of the present invention decomposes and evaporates during a long time heating and is an advantageous finish for synthetic filament that decreases tar buildup on heater rolls or plates in yarn production and down-stream processing.

In addition, the biodegradability data shows that the EO/PO polyether polyester of the present invention is completely biodegradable and gives no influence on environment if a part of the component is washed out from textile products in a subsequent process. Thus the wastewater containing the component can be treated in the same manner as that for surfactants or detergents available in market.

What is claimed is:

1. A finish composition for synthetic fiber comprising one or more of polyether polyester compounds having a molecular weight of 1,000 to 20,000 and represented by the formula: X—(A—B)$_n$—A'—Y, wherein each of X and Y is independently hydrogen, or a residue of $C_{1-18}$ linear or branched saturated alcohol or $C_{1-18}$ fatty acid; each of A and A' is a residue of ethylene oxide/propylene oxide block or random copolymer containing ethylene oxide and propylene oxide from 9:1 to 1:9 mol ratio; B is an aliphatic dibasic acid residue represented as OOC(CH$_2$)$_m$COO; m is an integer from 1 to 4; and n is an integer from 1 to 3.

2. A finish composition for textured filament yarn according to claim 1, which contains one or more of said polyether polyester compounds synthesized with an acidic or weak acidic catalyst, wherein each of A and A' in the formula contains ethylene oxide and propylene oxide from 9:1 to 6:4 mol ratio.

3. A finish composition for textured filament yarn according to claim 1, wherein said aliphatic dibasic acid is malonic acid.

* * * * *